United States Patent
Dias et al.

(10) Patent No.: US 7,667,621 B2
(45) Date of Patent: Feb. 23, 2010

(54) PRIMARY FLIGHT DISPLAY (PFD) INCLUDING WEATHER INFORMATION AND TERRAIN AWARENESS

(75) Inventors: Antonio M. Dias, Narragansett, RI (US); Steven W. Jacobson, Millbury, MA (US)

(73) Assignee: Avidyne Corporation, Lincoln, MA (US)

( * ) Notice: Subject to any disclaimer, the term of this patent is extended or adjusted under 35 U.S.C. 154(b) by 301 days.

(21) Appl. No.: 11/702,423

(22) Filed: Feb. 5, 2007

(65) Prior Publication Data

US 2008/0278351 A1 Nov. 13, 2008

Related U.S. Application Data

(60) Provisional application No. 60/765,528, filed on Feb. 6, 2006.

(51) Int. Cl.
*G08B 23/00* (2006.01)
(52) U.S. Cl. .................. 340/963; 340/970; 701/14

(58) Field of Classification Search .............. 340/963, 340/961, 968, 970; 701/3, 14
See application file for complete search history.

(56) References Cited

U.S. PATENT DOCUMENTS

| | | | |
|---|---|---|---|
| 5,936,552 A * | 8/1999 | Wichgers et al. ............ 340/963 |
| 6,092,009 A * | 7/2000 | Glover ....................... 701/14 |
| 6,122,570 A * | 9/2000 | Muller et al. ............... 340/970 |
| 6,347,263 B1 * | 2/2002 | Johnson et al. ............... 701/14 |
| 6,653,947 B2 * | 11/2003 | Dwyer et al. ............... 340/970 |
| 6,678,588 B2 * | 1/2004 | He .............................. 701/3 |
| 2006/0238402 A1 * | 10/2006 | Khatwa ...................... 340/970 |
| 2007/0146364 A1 * | 6/2007 | Aspen ........................ 345/426 |
| 2007/0171094 A1 * | 7/2007 | Alter et al. .................. 340/970 |
| 2007/0176794 A1 * | 8/2007 | Feyereisen et al. .......... 340/970 |

* cited by examiner

*Primary Examiner*—John A Tweel, Jr.
(74) *Attorney, Agent, or Firm*—Hamilton, Brook, Smith & Reynolds, P.C.

(57) ABSTRACT

The present invention provides a method and system for displaying critical navigational data on a primary flight display to a pilot of an aircraft. The method includes providing an image representative of weather information on a primary fight display and superimposing an image representative of a terrain warning indicator over at least part of the image representative of weather information.

21 Claims, 7 Drawing Sheets

PRIMARY FLIGHT DISPLAY (PFD) INCLUDING WEATHER INFORMATION AND TERRAIN AWARENESS

RELATED APPLICATION(S)

This application claims the benefit of U.S. Provisional Application Ser. No. 60/765,528, filed on Feb. 6, 2006, the entire teachings of which are incorporated by reference.

BACKGROUND OF THE INVENTION

For the most part, Electronic Flight Information Systems (EFIS) have replaced conventional aircraft electromechanical flight instruments for displaying primary flight and navigational data to an aircraft pilot or a member of the aircrew. EFIS systems present all information necessary for a current phase of flight in a compact display. An EFIS system typically includes an engine indication and crew alerting system (EICAS) display, a multi-function display (MFD), and a primary flight display (PFD).

The EICAS displays information about an aircraft's systems, such as the fuel, electrical systems, and propulsion systems. An EICAS display typically mimics conventional round (circular) gauges while supplying digital readouts of the measured parameters.

The EICAS improves situational awareness by allowing aircrew members to view complex information in a graphical format. The EICAS also can alert the aircrew members to unusual or hazardous situations. For example, if an engine begins to lose oil pressure, the EICAS can sound an alert (alarm), switch the display to the page with oil system information and outline the low oil pressure data with a red box. Unlike conventional round gauges, a user can set many levels of warnings and alarms.

The MFD displays navigational and weather information received from multiple systems. Typically, an MFD is "chart-centric", where aircrew members can overlay different information over a map or chart. For example, MFD overlay information can include an aircraft's current route plan, weather information, restricted airspace information, and aircraft traffic information. The MFD can also view non-overlay types of data (e.g., current route plan) and calculated overlay types of data (e.g., the glide radius of the aircraft, given current location over terrain, winds, and aircraft speed and altitude).

As with the EICAS, the MFD can display information about aircraft systems, such as fuel and electrical systems. The MFD can improve a pilot's situational awareness by changing the color or shape of the data to alert aircrew members to hazardous situations (e.g., low airspeed, high rate of decent, terrain warnings).

The PFD displays all information critical to a flight, including airspeed, altitude, heading, attitude, vertical speed and yaw. The PFD improves a pilot's situational awareness by integrating this information into a single display instead of six different analog (conventional) instruments, thereby reducing the amount of time necessary to monitor the instruments.

As with the MFD, the PFD increases situational awareness by alerting aircrew members to unusual or potentially hazardous conditions by changing the color or shape of the display and/or by providing audio alerts.

SUMMARY OF THE INVENTION

Although these systems provide increased situational awareness, a need exists to combine weather information and terrain warnings onto a Navigation Display (ND), (e.g. a PFD) to provide the pilot with a navigational aide for avoiding these conditions.

The present invention provides a method and system for displaying critical navigational data on a primary flight display to a pilot of an aircraft. The method includes providing an image representative of weather information on a primary fight display and superimposing an image representative of a terrain warning indicator over at least part of the image representative of weather information.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1A:
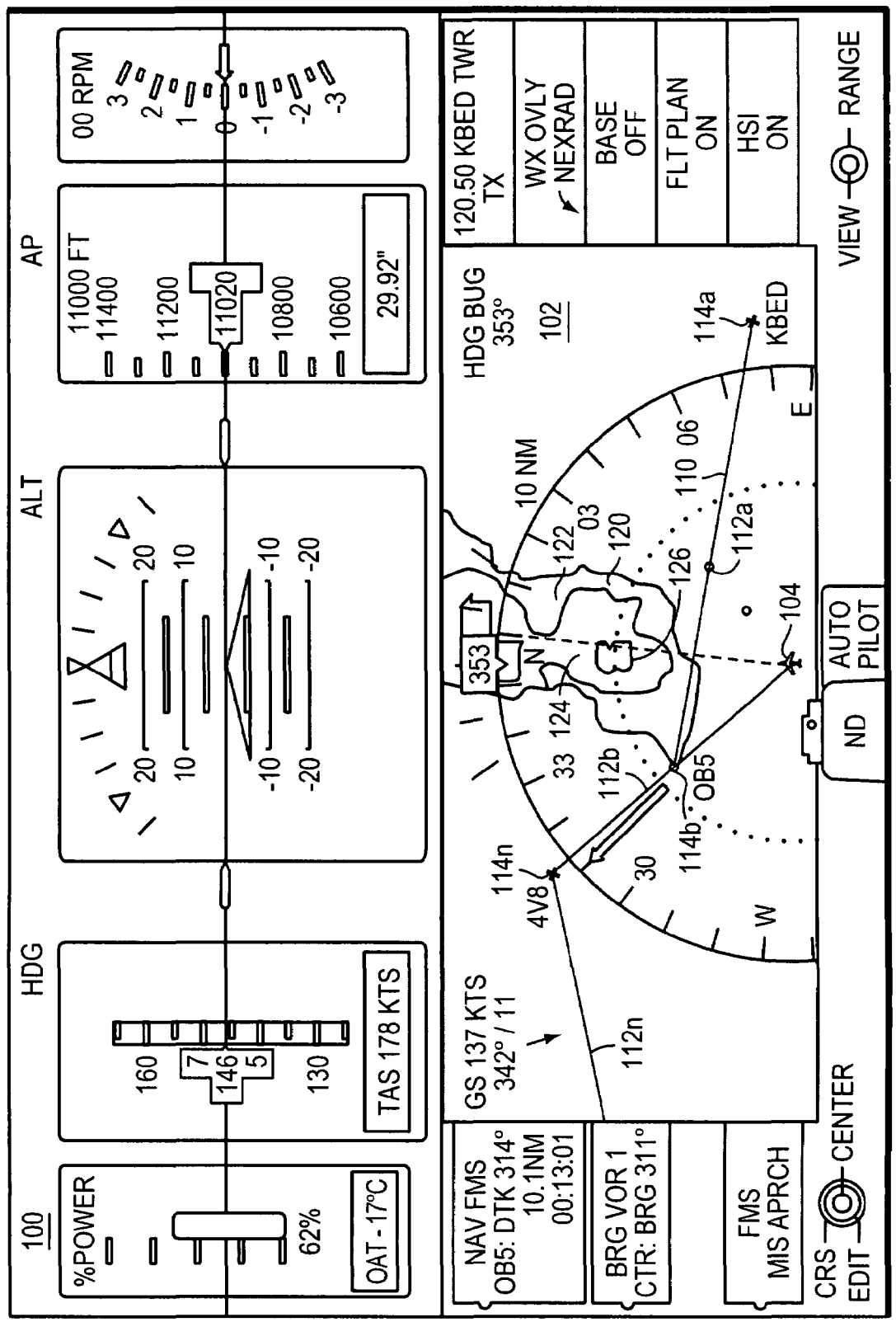
FIG. 1A is an illustration of a Primary Flight Display (PFD) showing the flight status of an aircraft on the top half and a navigation status on the bottom half, the navigation status including weather information.

FIG. 1A illustrates a primary flight display (PFD) 100 utilizing the concepts of the present invention. The PFD 100 includes multiple windows for displaying mission critical information. For example, the HDG BUG 102 is a heading indicator that shows an overhead illustration of the heading of the aircraft 104 with relation to the ground. The HDG BUG 102 can include an indication of a flight path 110 of the aircraft and image 120 representative of the weather conditions/information. The flight path 110 includes flight legs 112a, 112b . . . 112n bounded by waypoints 114a, 114b . . . 114n. It should be understood that the inventive concepts can be used on any flight display.

The image 120 representative of weather conditions/information provides the pilot with increased situational awareness and reduces the possibility of accidents associated with flying into severe weather conditions. Weather data/information is received from ground, satellite, weather datalink, radar and other known in-flight weather systems. The intensity of the weather is shown ranging from green to red, wherein green 122 is the lowest intensity (e.g., light rain), yellow 124 is moderate intensity (e.g. light to heavy rain), and red 126 is severe intensity (e.g., heavy rain, thunderstorms). Although the present invention uses green, yellow, and red colors as warning indicators it should be known to one skilled in the art that any colors, patterns, or symbols known in the industry can be used.

Figure 1B:
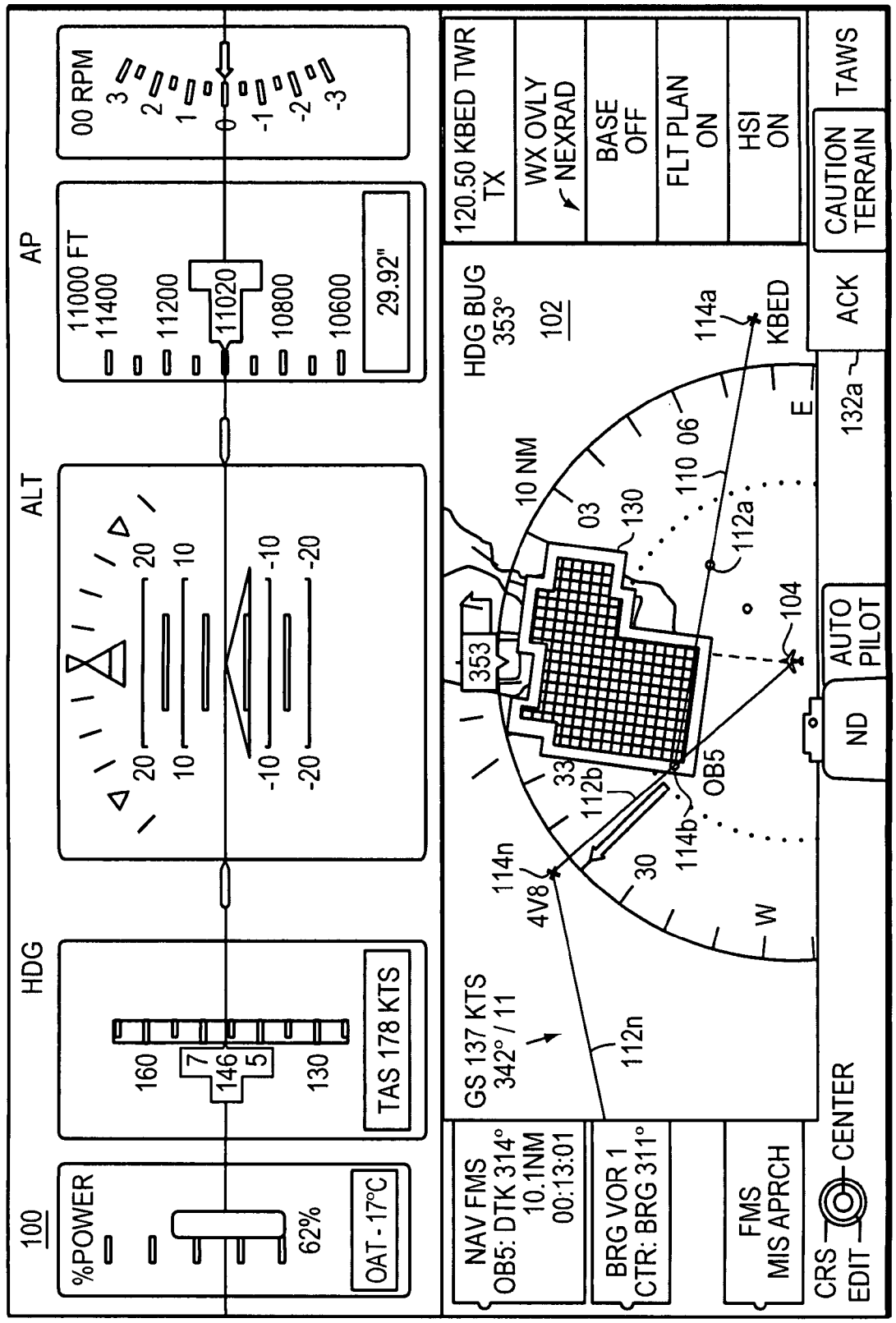
FIG. 1B is an illustration of a PFD showing the flight status of an aircraft on the top half and a navigation status on the bottom half, the navigation status including terrain caution information overlaid with weather information.
Figure 1C:
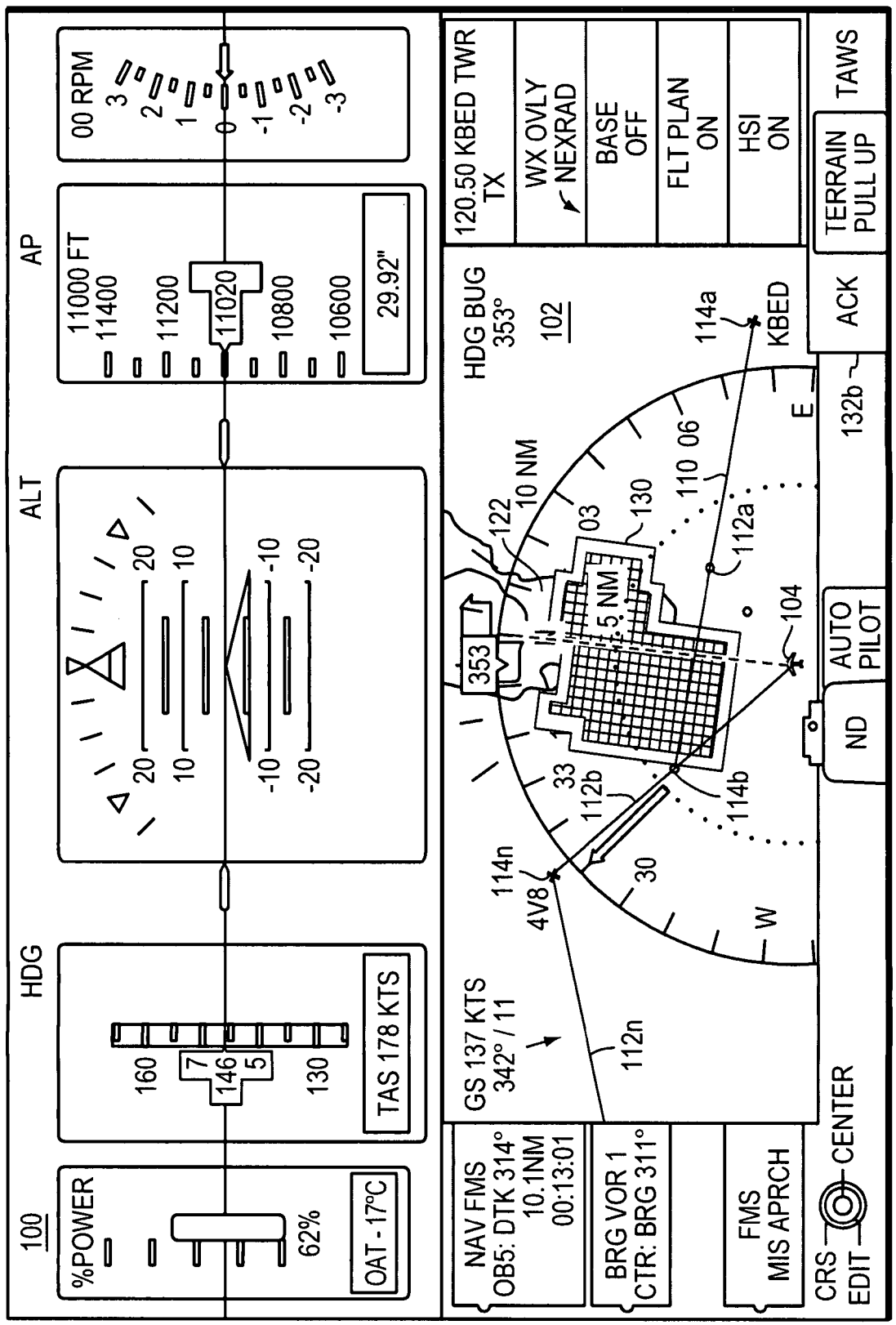
FIG. 1C is an illustration of a PFD showing the flight status of an aircraft on the top half and a navigation status on the bottom half, the navigation status including terrain warning information overlaid with weather information.

As shown in FIGS. 1B-1C, a Terrain Awareness System is used to provide the pilot with increased situational awareness and reduce the possibility of accidents associated with Controlled Flight Into Terrain (CFIT). Thus, while the aircraft is in flight, calculations are being made as to the height of the terrain in the aircraft's flight path 110. The calculation is generated from a database of terrain heights and the aircraft's position, as determined by a GPS receiver connected to the EFIS. The calculation may also be generated by ground mapping radar or terrain sensors. If it is determined the aircraft is in danger of CFIT, a terrain warning indication 130 is superimposed over the image 120 representative of weather conditions.

The terrain warning indication 130 provides a caution indicator 132a (FIG. 1B) if the aircraft is within one-minute of CFIT and a severe indicator 132b (FIG. 1C) if the aircraft is within thirty seconds of CFIT. The color associated with the caution indicator 132a is yellow, while the color associated with the severe indicator 132b is red. The terrain warning indication 130 encompasses the hazardous terrain condition within a set boundary while allowing the pilot to view the image 120 representative of weather conditions. This provides the pilot with optimal situational awareness since the pilot can make a decision based on both hazardous conditions simultaneously.

The terrain warning indication 130 is shown as a waffle-type like pattern. The waffle-type like pattern includes opaque blocks representative of terrain mapping information and translucent rows and columns for allowing the pilot to view through the terrain warning indication 130. The opaque blocks can be any shape known for displaying terrain mapping information.

Although extreme weather conditions and CFIT can be hazardous to an aircraft, there is a greater probability of flying through an extreme weather condition than there is hitting an object. Thus, the image 120 representative of weather conditions is dimmed an amount in relation to the terrain warning indication 130 depending upon the proximity of the aircraft to the hazard. The image 120 representative of weather conditions, for example, can be dimmed by twenty-five percent while the aircraft is one-minute of CFIT. The image 120 representative of weather conditions, for example, can be dimmed by fifty percent while the aircraft is thirty seconds of CFIT. The image 120 representative of weather conditions is not completely turned off because it allows the pilot to make an informed decision based on both hazardous conditions simultaneously. It should be understood that variations to the time and dimming intensity can vary.

Figure 2A:
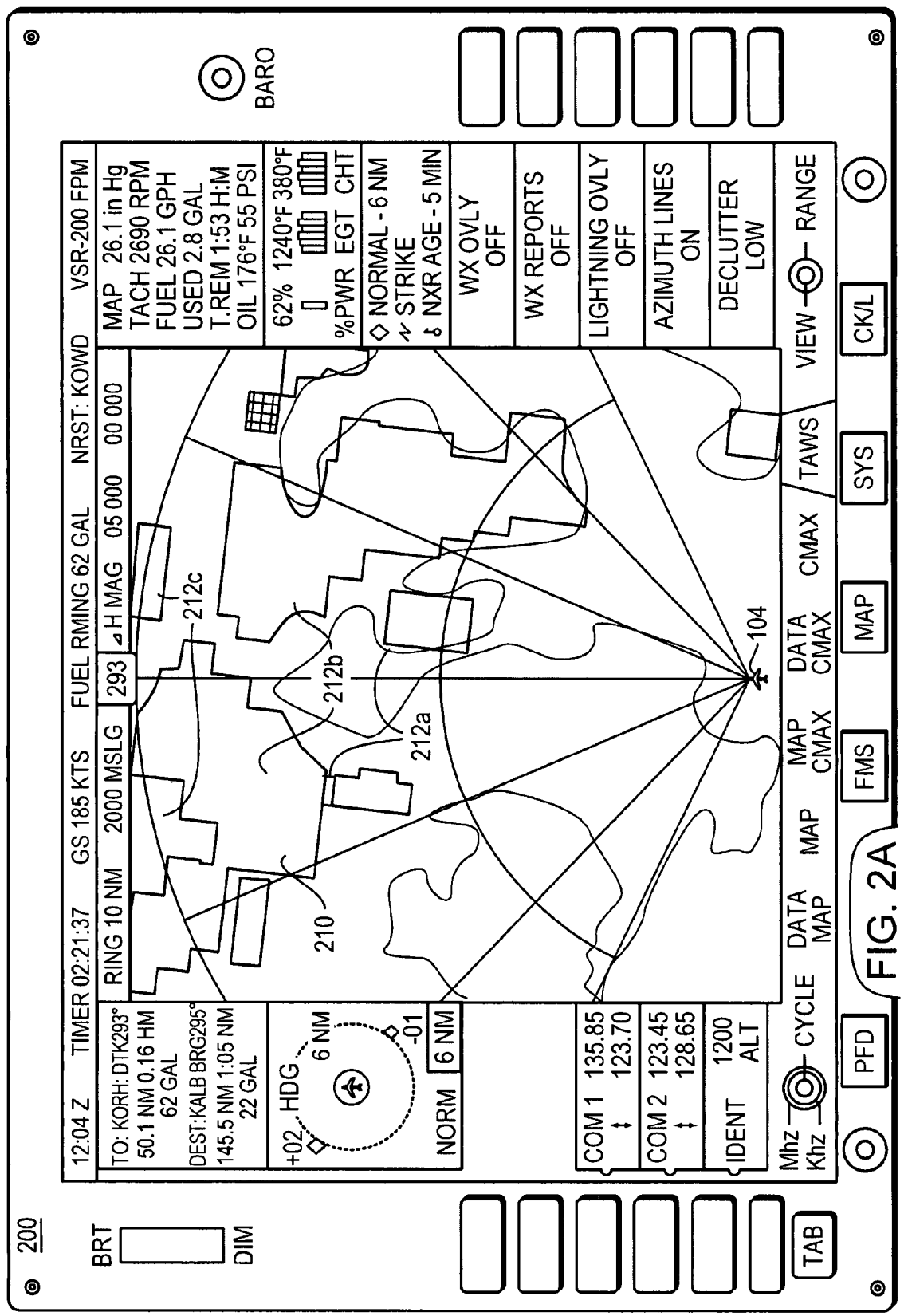
FIG. 2A is an illustration of a Multi-Function Display (MFD) showing the position of an aircraft and terrain information proximate to the flight path of the aircraft.
Figure 2B:
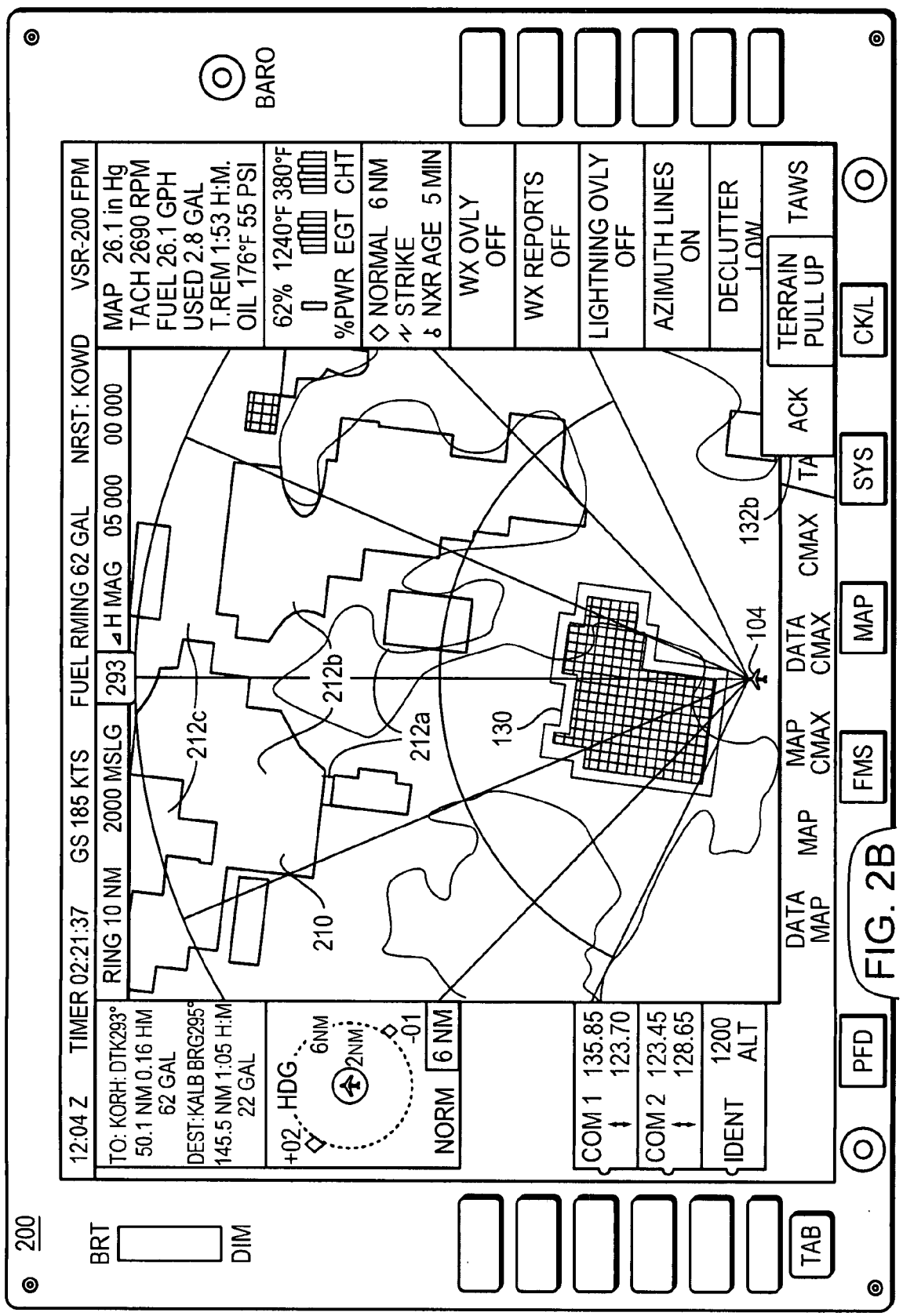
FIG. 2B is an illustration of a MFD showing the position of an aircraft and terrain information and warnings proximate to the flight path of the aircraft.

FIG. 2A illustrates a multifunction flight display (MFD) 200 utilizing the concepts as described with reference to FIGS. 1A-1C. In one embodiment, an image 210 representative of terrain conditions within the aircraft's flight path is displayed on the MFD 200. The height of the terrain is shown ranging from green to red, wherein green 212a is no danger (e.g., low terrain), yellow 212b is moderate danger (e.g. terrain close to height of aircraft), and red 212c is severe danger (e.g., terrain at or above height of aircraft). This embodiment allows the pilot to view actual terrain heights, thereby allowing the pilot to make an informed decision based on the height of the terrain. As shown in FIG. 2B, the terrain warning indication 130 is displayed if the aircraft is in danger of CFIT.

Figure 3A:
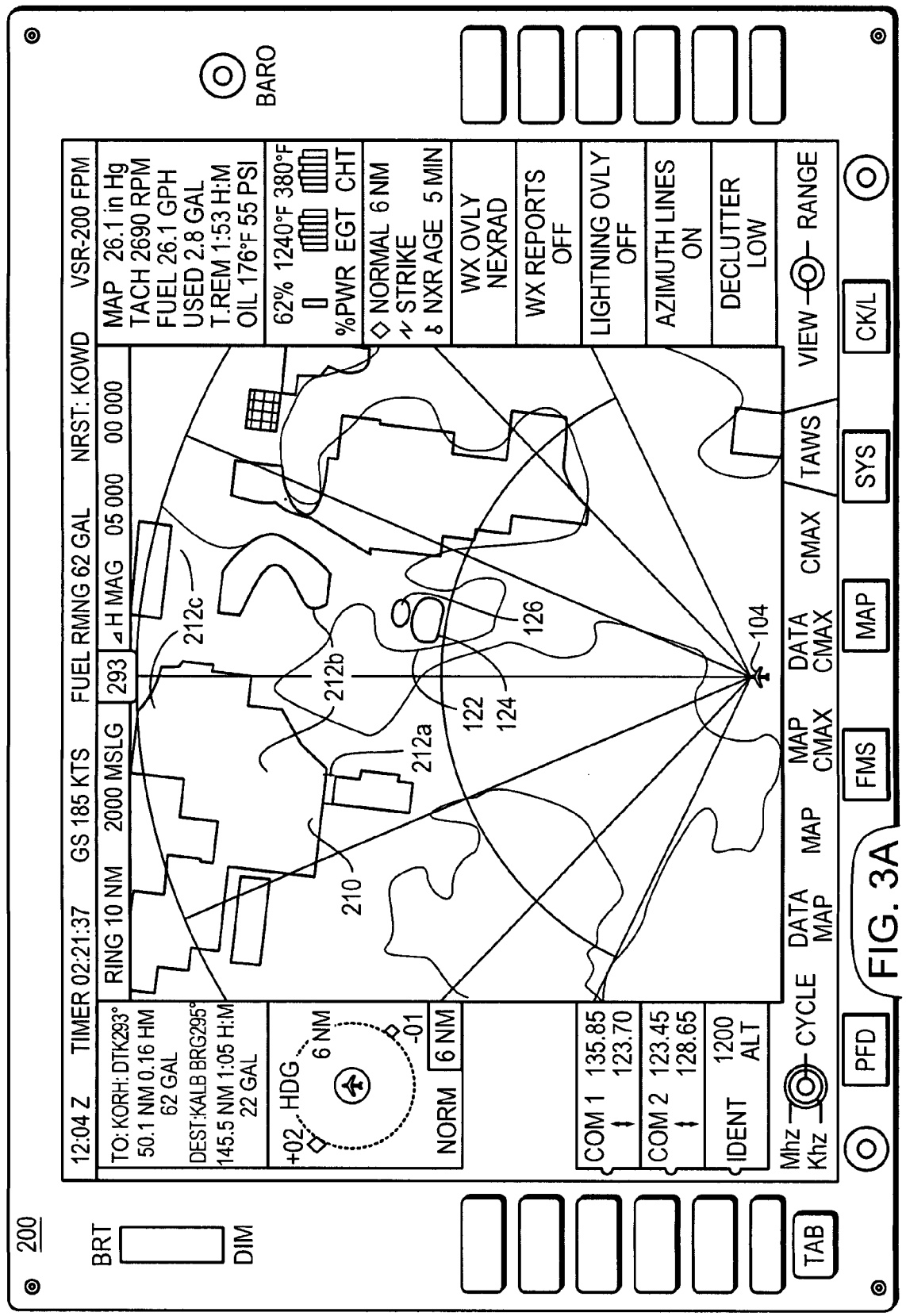
FIG. 3A is an illustration of a MFD showing the position of an aircraft, and terrain information and weather information proximate to the flight path of the aircraft.
Figure 3B:
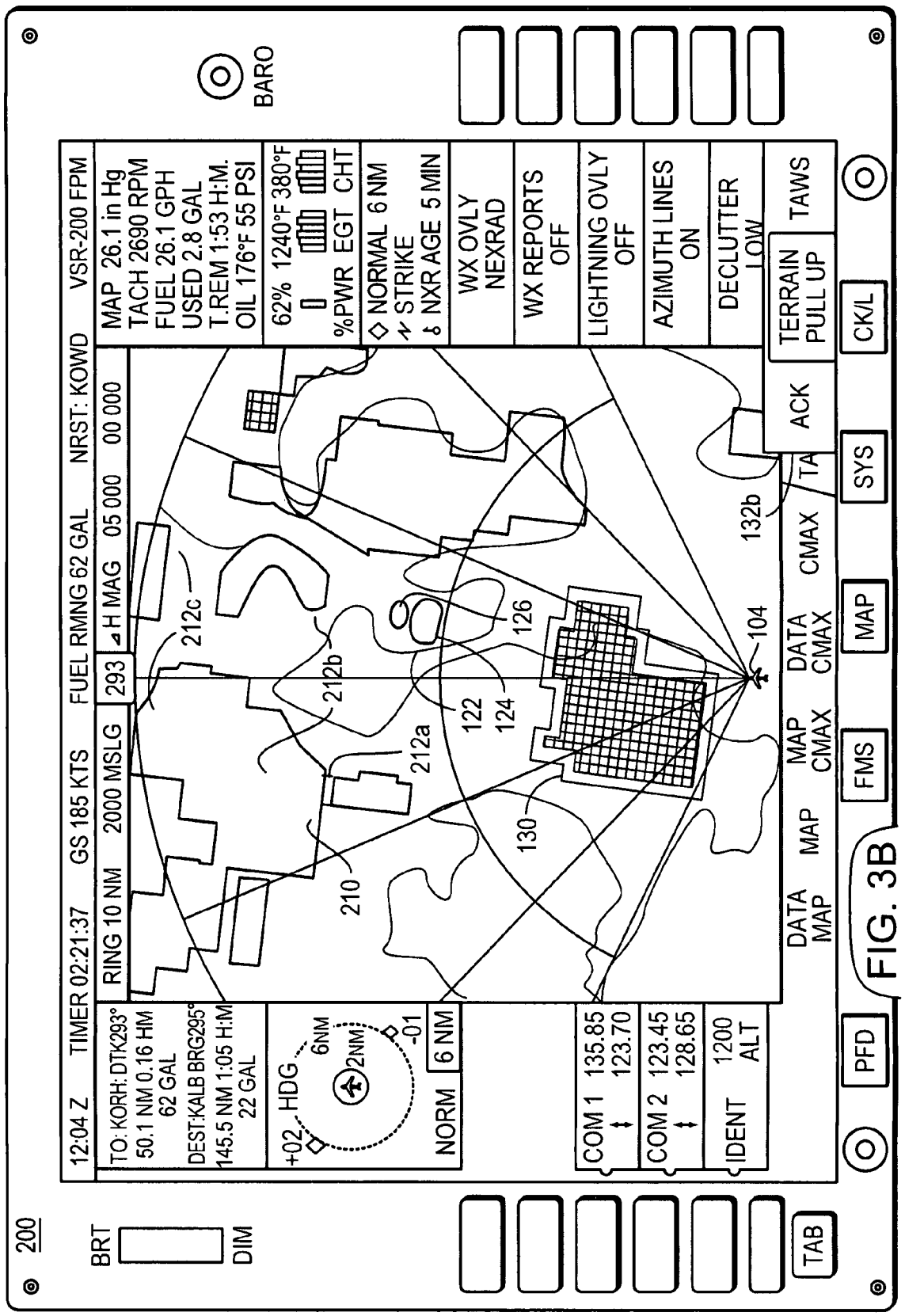
FIG. 3B is an illustration of a MFD showing the position of an aircraft, and terrain information and warnings and weather information proximate to the flight path of the aircraft.

FIG. 3A illustrates a multifunction flight display (MFD) 200 utilizing the concepts as described with reference to FIGS. 1A-2B. In another embodiment, an image 120 representative of weather conditions and an image 210 representative of terrain conditions within the aircraft's flight path are displayed on the MFD 200. This embodiment allows the pilot to view actual terrain heights along with weather conditions, thereby allowing the pilot to make an informed decision on both hazardous conditions simultaneously. As shown in FIG. 3B, the terrain warning indication 130 is displayed if the aircraft is in danger of CFIT.

While this invention has been particularly shown and described with references to preferred embodiments thereof, it will be understood by those skilled in the art that various changes in form and details may be made therein without departing from the scope of the invention encompassed by the appended claims.

What is claimed is:

1. A system for providing weather information and terrain information to a pilot during flight of an aircraft, comprising:
   a device on an aircraft to gather weather information in an area proximate to the aircraft;
   a navigation unit that determines the location of the aircraft;
   a terrain database coupled to the navigation unit that provides terrain altitude information for the area proximate to the determined location of the aircraft; and
   a display to simultaneously present the weather information superimposed on the terrain altitude information to the pilot, the weather information being presented according to a first scale to depict severity of the presented weather information, and the terrain altitude information being presented according to a second scale, different and distinct from the first scale, to depict severity of threat of the presented terrain information.

2. The system of claim 1 wherein the navigation unit determines the location of the aircraft via a Global Positioning Satellite (GPS) receiver.

3. The system of claim 1 wherein the display is a Multi-Function Display (MFD).

4. The system of claim 1 wherein the display is a Primary Flight Display (PFD).

5. A method for providing weather information and terrain information to a pilot during flight of an aircraft, comprising:
   obtaining weather information in an area proximate to the position of an aircraft;
   obtaining terrain altitude information in an area proximate to the position of the aircraft;
   providing an image representative of the area proximate to the position of the aircraft and superimposing an image representative of the obtained weather information in the area and superimposing an image representative of the obtained terrain information in the area, the superimposed image representative of the obtained weather information in the area being superimposed according to a first scale to depict severity of the obtained weather information, and the superimposed image representative of the obtained terrain altitude information in the area being superimposed according to a second scale, different and distinct from the first scale, to depict severity of threat of the obtained terrain altitude information.

6. The method of claim 5 wherein the first scale to depict severity of the obtained weather information is a scale based on intensity of the image; and further comprising decreasing the intensity of the image of the representative of weather information relative to the intensity of the image representative of terrain information.

7. The method of claim 6 wherein decreasing the intensity of the image representative of weather information includes decreasing the intensity of the image representative of weather information by about ten percent to about fifty percent for a caution terrain warning.

8. The method of claim 6 wherein decreasing the intensity of the image representative of weather information includes decreasing the intensity of the image representative of weather information by about twenty-five percent to about seventy-five percent for a severe terrain warning.

9. The method of claim 5 wherein superimposing an image of the obtained terrain altitude information includes displaying a caution terrain warning when the aircraft is about one minute from a terrain location.

10. The method of claim 5 wherein superimposing an image of the obtained terrain altitude information includes displaying a severe terrain warning when the aircraft is about thirty seconds from a terrain location.

11. The method of claim 5 wherein superimposing an image of the obtained weather information in the area and superimposing an image of the obtained terrain information in the area includes contrasting the image of the obtained weather information and the image of the obtained weather information via intensity.

12. The method of claim 5 wherein one of the first and second scales uses different colors.

13. The method of claim 5 wherein providing an image representative of the obtained weather information and representative of the obtained terrain information includes displaying the weather information in solid form and the terrain information in broken form such that the weather information is partially visible through the terrain information.

14. The method of claim 5 wherein providing an image representative of the obtained weather information and obtained terrain information includes visually distinguishing weather images from terrain images via patterns.

15. The method of claim 5 wherein obtaining the terrain information includes determining a position of the aircraft and retrieving terrain information for an area proximate to the aircraft from a database.

16. A method for informing a pilot of weather information and terrain warnings during flight of an aircraft, comprising:
providing an image representative of weather information on a navigation display;
and superimposing an image representative of a terrain warning indicator over at least part of the image representative of weather information, the image representative of the weather information being provided according to a first scale to depict severity of the weather information, and the superimposed image representative of the terrain warning indicator being superimposed according to a second scale, different and distinct from the first scale, to depict severity of the terrain warning indicator.

17. The method of claim 16 wherein the first scale is based on intensity of the image representative of weather information; and further comprising decreasing the intensity of the image representative of weather information.

18. The method of claim 17 wherein decreasing the intensity of the image representative of weather information includes decreasing the intensity by about ten percent to about fifty percent for a caution terrain warning.

19. The method of claim 17 wherein decreasing the intensity of the image representative of weather information includes decreasing the intensity by about twenty-five percent to about seventy-five percent for a severe terrain warning.

20. The method of claim 16 further providing a caution terrain warning is displayed when a flight path aircraft is within one-minute of a terrain location.

21. The method of claim 16 further providing a severe terrain warning is displayed when a flight path aircraft is within thirty seconds of a terrain location.

* * * * *

UNITED STATES PATENT AND TRADEMARK OFFICE
CERTIFICATE OF CORRECTION

PATENT NO. : 7,667,621 B2  
APPLICATION NO. : 11/702423  
DATED : February 23, 2010  
INVENTOR(S) : Dias et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 319 days.

Signed and Sealed this

Seventh Day of December, 2010

David J. Kappos  
*Director of the United States Patent and Trademark Office*